(12) United States Patent
Grayson et al.

(10) Patent No.: US 9,993,778 B2
(45) Date of Patent: Jun. 12, 2018

(54) DIFFUSION HORN

(71) Applicant: The Boeing Company, Chicago, IL (US)

(72) Inventors: Gary D. Grayson, Huntington Beach, CA (US); Martin E. Lozano, Whittier, CA (US); Victor J. Barackman, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 230 days.

(21) Appl. No.: 15/177,169

(22) Filed: Jun. 8, 2016

(65) Prior Publication Data

US 2017/0354935 A1    Dec. 14, 2017

(51) Int. Cl.
*B01F 3/04*    (2006.01)

(52) U.S. Cl.
CPC    *B01F 3/04262* (2013.01); *B01F 2003/04361* (2013.01)

(58) Field of Classification Search
CPC ................... B01F 3/04262; B01F 2003/04361
USPC ................ 261/30, 76, 105, 119.1; 239/590.3
See application file for complete search history.

(56) References Cited

U.S. PATENT DOCUMENTS

| | | | | |
|---|---|---|---|---|
| 5,024,061 A | * | 6/1991 | Pfeil, Jr. ................. | F25B 45/00 62/292 |
| 6,017,449 A | * | 1/2000 | Eriksson ............. | B01F 3/04262 210/194 |
| 6,047,903 A | * | 4/2000 | Meyer .................... | A62C 31/02 239/524 |
| 6,152,997 A | * | 11/2000 | Cheng ................. | B01F 3/04262 55/342 |

* cited by examiner

*Primary Examiner* — Charles Bushey
(74) *Attorney, Agent, or Firm* — Kunzler, PC

(57) ABSTRACT

A diffuser is disclosed and includes a channel with an inner portion having an inlet and an outlet through which a gaseous substance enters and exits the diffuser, respectively. The inner portion includes a first conical section that has an increasing cross-sectional area, taken along a plane perpendicular to a central axis, in a first direction. The inner portion also includes a second conical section that has a decreasing cross-sectional area, taken along a plane perpendicular to the central axis, in the first direction. The second conical section is communicatively coupled with the first conical section. The outer portion includes a first annular section that has an increasing cross-sectional area, taken along a plane perpendicular to the central axis, in a second direction opposite the first direction. The diffuser further includes a plurality of orifices that communicatively couple the second conical section with the first annular section.

20 Claims, 7 Drawing Sheets

DIFFUSION HORN

GOVERNMENT LICENSE RIGHTS

This invention was made with Government support under Contract No. HR0011-14-9-0005 awarded by Department of Defense Advanced Research Projects Agency. The Government has certain rights in this invention.

FIELD

This disclosure relates generally to pressurized tanks, and more particularly to diffusing a gaseous substance into a pressurized tank.

BACKGROUND

Gaseous substances have been used to replace a liquid drained from a pressurized tank in order to maintain the pressure within the pressurized tank. However, due to the relatively high rates of gaseous substance often needed to replace the liquid drained from the pressurized tank, the velocity of the gaseous substance entering the pressurized tank can be considerably high. Diffusers have been used to try to reduce the velocity of gaseous substances entering a pressurized tank.

SUMMARY

The subject matter of the present application has been developed in response to the present state of the art, and in particular, in response to the problem of, and the need to, reduce the velocity of gaseous substances entering a pressurized tank containing a liquid, that have not yet been fully solved by currently available techniques. Accordingly, the subject matter of the present application has been developed to provide a diffuser, and associated systems and methods, for diffusing gaseous substances into a pressurized tank that overcomes at least some of the above-discussed shortcomings of prior art techniques.

A diffuser, for diffusing a gaseous substance, is disclosed and includes a channel with an inner portion having an inlet through which the gaseous substance enters the diffuser and an outer portion having an outlet through which the gaseous substance exits the diffuser. The inner portion includes a first conical section that has an increasing cross-sectional area, taken along a plane perpendicular to a central axis, in a first direction. Additionally, the inner portion includes a second conical section that has a decreasing cross-sectional area, taken along a plane perpendicular to the central axis, in the first direction. The second conical section is communicatively coupled with the first conical section. The outer portion includes a first annular section that has an increasing cross-sectional area, taken along a plane perpendicular to the central axis, in a second direction opposite the first direction. The diffuser further includes a plurality of orifices that communicatively couple the second conical section with the first annular section. The preceding subject matter of this paragraph characterizes example 1 of the present disclosure.

The outer portion further includes a second annular section, communicatively coupled with the first annular section. Furthermore, the outer portion includes a third annular section, communicatively coupled with the second annular section. In the second direction, the first annular section is angled outwardly away from the central axis, the second annular section is angled inwardly toward the central axis, and the third annular section is angled outwardly away from the central axis. The preceding subject matter of this paragraph characterizes example 2 of the present disclosure, wherein example 2 also includes the subject matter according to example 1, above.

A cross-section of the outer portion, taken along a plane parallel to and extending through the central axis, is S-shaped. The preceding subject matter of this paragraph characterizes example 3 of the present disclosure, wherein example 3 also includes the subject matter according to any one of examples 1 or 2, above.

The inner portion and the outer portion are concentric with the central axis. The preceding subject matter of this paragraph characterizes example 4 of the present disclosure, wherein example 4 also includes the subject matter according to any one of examples 1-3, above.

Each orifice of the plurality of orifices is diamond-shaped. The preceding subject matter of this paragraph characterizes example 5 of the present disclosure, wherein example 5 also includes the subject matter according to any one of examples 1-4, above.

The plurality of orifices are arranged in at least one pattern that is symmetrical. The preceding subject matter of this paragraph characterizes example 6 of the present disclosure, wherein example 6 also includes the subject matter according to any one of examples 1-5, above.

The diffuser further includes at least one separator in the outer portion. The separator separates the outer portion into at least two sub-channels. The preceding subject matter of this paragraph characterizes example 7 of the present disclosure, wherein example 7 also includes the subject matter according to any one of examples 1-6, above.

The plurality of orifices are arranged in at least two symmetrical patterns. Furthermore, the orifices of the plurality of orifices of each of the at least two symmetrical patterns communicatively couple the second conical section with a respective one of the at least two sub-channels. The preceding subject matter of this paragraph characterizes example 8 of the present disclosure, wherein example 8 also includes the subject matter according to example 7, above.

The at least one separator extends along a partial length of the first annular section of the outer portion. The preceding subject matter of this paragraph characterizes example 9 of the present disclosure, wherein example 9 also includes the subject matter according to any one of examples 7 or 8, above.

The inlet is parallel to the central axis and the outlet is perpendicular to the central axis. The preceding subject matter of this paragraph characterizes example 10 of the present disclosure, wherein example 10 also includes the subject matter according to any one of examples 1-9, above.

The outer portion wraps around the inner portion. The preceding subject matter of this paragraph characterizes example 11 of the present disclosure, wherein example 11 also includes the subject matter according to any one of examples 1-10, above.

The inner portion further includes a neck section between the inlet and the first conical section. The neck section has a cross-sectional area, taken along a plane perpendicular to the central axis, that is smaller than any cross-sectional area, taken along a plane perpendicular to the central axis, of the inlet and any cross-sectional area, taken along a plane perpendicular to the central axis, of the first conical section. The preceding subject matter of this paragraph characterizes example 12 of the present disclosure, wherein example 12 also includes the subject matter according to any one of examples 1-11, above.

A ratio of a cross-sectional area of the inlet to a combined cross-sectional area of the plurality of orifices is at least two. The preceding subject matter of this paragraph characterizes example 13 of the present disclosure, wherein example 13 also includes the subject matter according to any one of examples 1-12, above.

A cross-sectional area of the first conical section is greater than a cross-sectional area of the inlet. Additionally, a cross-sectional area of the second conical section is greater than a cross-sectional area of the inlet. The preceding subject matter of this paragraph characterizes example 14 of the present disclosure, wherein example 14 also includes the subject matter according to any one of examples 1-13, above.

The diffuser has a one-piece monolithic construction. The preceding subject matter of this paragraph characterizes example 15 of the present disclosure, wherein example 15 also includes the subject matter according to any one of examples 1-14, above.

The outlet is between the inlet and the second conical section. The preceding subject matter of this paragraph characterizes example 16 of the present disclosure, wherein example 16 also includes the subject matter according to any one of examples 1-15, above.

A system, including a pressurized tank, liquid discharge line, gas delivery line, and diffuser, is disclosed. The pressurized tank is configured to contain a liquid within an interior of the pressurized tank. The liquid discharge line is in communication with the pressurized tank to discharge liquid from the pressurized tank. The gas delivery line is in communication with the pressurized tank to deliver a gaseous substance to the pressurized tank. The diffuser is fixed to and positioned within the interior of the pressurized tank, in communication with the gas delivery line to receive the gaseous substance from the gas delivery line and deliver the gaseous substance into the interior of the pressurized tank. The diffuser includes a channel that includes an inner portion, having an inlet through which the gaseous substance enters the diffuser, and an outer portion, having an outlet through which the gaseous substance exits the diffuser. The inner portion includes a first conical section having an increasing cross-sectional area, taken along a plane perpendicular to a central axis in a first direction. The inner portion further includes a second conical section, having a decreasing cross-sectional area, taken along a plane perpendicular to the central axis, in the first direction. The second conical section is communicatively coupled with the first conical section. The outer portion wraps around the inner portion. The cross-section of the outer portion, taken along a plane perpendicular to the central axis, is annular-shaped. A cross-section of the outer portion, taken along a plane parallel to and extending through the central axis, is S-shaped. The diffuser also includes a plurality of orifices, communicatively coupling the second conical section with the outer portion. The preceding subject matter of this paragraph characterizes example 17 of the present disclosure.

Also disclosed herein is a method of diffusing a gaseous substance. The method includes passing the gaseous substance through an inlet of an inner portion of a channel in a first direction along a central axis. Additionally, the method includes expanding the gaseous substance, received from the inlet, in a first conical section of the inner portion of the channel. The method also includes compressing the gaseous substance, received from the first conical section, in a second conical section of the inner portion of the channel. Furthermore, the method includes passing the gaseous substance, from the second conical section, to a first annular section of an outer portion of the channel through a plurality of orifices. Also, the method includes expanding the gaseous substance, received from the plurality of orifices, in the first annular section, and expelling the gaseous substance, from the outer portion, through an outlet of the outer portion. The preceding subject matter of this paragraph characterizes example 18 of the present disclosure.

The method additionally includes passing the gaseous substance through the first annular section in a direction away from the central axis, passing the gaseous substance, from the first annular section, through a second annular section of the outer portion in a direction towards the central axis, passing the gaseous substance, from the second annular section to the outlet, through a third annular section of the outer portion in a direction away from the central axis. The preceding subject matter of this paragraph characterizes example 19 of the present disclosure, wherein example 19 also includes the subject matter according to example 18, above.

The method further includes sonically choking the gaseous substance passing through the plurality of orifices. The preceding subject matter of this paragraph characterizes example 20 of the present disclosure, wherein example 20 also includes the subject matter according to any one of examples 18 or 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
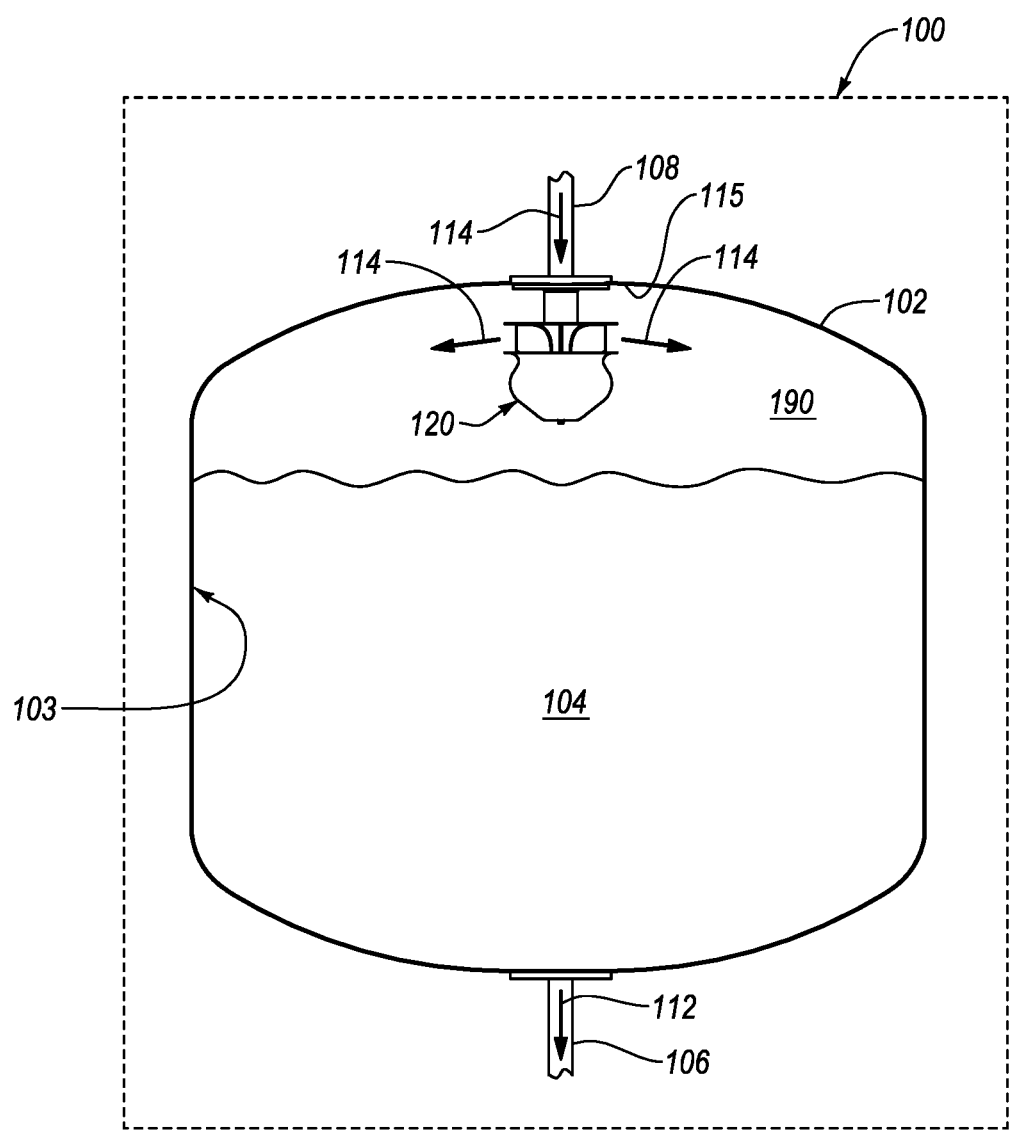
FIG. 1 is a schematic side elevation view of a system with a diffuser, according to one or more embodiments of the present disclosure.

Referring to FIG. 1, one embodiment of a system 100 is shown. The system 100 may include a complex structure, such as a vehicle (e.g., aircraft, watercraft, rocket, automobile, etc.) or a stationary structure (e.g., a factory, building, etc.). As shown, the system 100 also includes a pressurized tank 102 that contains a liquid 104, under pressure (e.g., greater than ambient pressure), within an interior 103 of the pressurized tank 102. The pressurized tank 102 or pressure vessel can be made from any of various materials, such as metal and fiber-reinforced composites, and have any of various sizes. The liquid 104 can be any of various liquids for which storage, under pressure, is desired. For example, in some implementations, the pressurized tank 102 is a fuel tank and the liquid 104 is a fuel. According to a particular implementation, the liquid 104 is a rocket propellant used to power a rocket engine.

The system 100 further includes a liquid discharge line 106 that is in communication with the pressurized tank 102 to discharge liquid 104 from the pressurized tank 102, as indicated by directional arrow 112. The liquid discharge line 106 includes a fluid conduit that delivers the liquid 104 from the pressurized tank 102 to an engine or other liquid-consuming object. Although not shown, the liquid discharge line 106 may include a valve that is selectively operable to allow liquid 104 in the pressurized tank 102 to flow into the liquid discharge line 106.

For proper operation of some liquid-consuming objects, the pressure of the liquid 104 received from the pressurized tank 102 should remain constant. To maintain a constant pressure of the liquid 104, the pressure in the pressurized tank 102 also should be held constant. Accordingly, as liquid 104 is drained from the pressurized tank 102, the drained liquid can be replaced with a gaseous substance 190 to maintain the pressure in the pressurized tank 102. To facilitate the delivery of the gaseous substance 190 into the pressurized tank 102, the system 100 further includes a gas delivery line 108 that is in communication with the pressurized tank 102. The gas delivery line 108 includes a fluid conduit that delivers the gaseous substance 190 from a source to the pressurized tank 102 as indicated by directional arrow 114. Although not shown, the gas delivery line 108 may include a valve that is selectively operable to allow the gaseous substance 190 to flow into the pressurized tank 102 in proportion to the liquid 104 being drained from the pressurized tank 102. The gaseous substance 190 can be any of various gases, such as helium, nitrogen, or vaporized propellants, such as hydrogen or oxygen, that are compatible with the liquid 104 in the pressurized tank 102.

In some implementations, a cross-section or flow area of the gas delivery line 108 is small in order to reduce mass and cost, as well as to improve reliability. However, because of the relatively high rates of gaseous substance 190 needed to replace the liquid 104 drained from the pressurized tank 102, the velocity of the gaseous substance 190 passing through the gas delivery line 108 and into the pressurized tank 102 can be relatively high, such as, for example, at sonic or supersonic velocities. Generally, for some applications, such as when the liquid 104 is a rocket fuel (e.g., cryogenic propellant), a gaseous substance 190, at relatively high speeds, near the liquid 104 can have negative consequences. For example, a gaseous substance 190, at relatively high speeds, near the liquid 104 can move the liquid 104 to undesirable locations within the pressurized tank 102, which may cause the gaseous substance 190 to be vented from the pressurized tank 102, instead of the liquid 104. As another example, a gaseous substance 190, at relatively high speeds, near the liquid 104 can increase thermal mixing between the gaseous substance 190 and the liquid 104 (e.g., increase convective heat transfer rate from the gaseous substance 190 to the liquid 104), which can decrease the temperature and pressure of the gaseous substance 190 and increase the temperature of the liquid 104. A decrease in the pressure of the gaseous substance 190 requires additional gaseous substance 190 to be delivered into the pressurized tank 102 to compensate for the pressure losses, which adds to the cost and complexity of the system 100. According to yet an additional example, a gaseous substance 190, at relatively high speeds, near the liquid 104 can increase mechanical mixing between the gaseous substance 190 and the liquid 104, which can create two-phase conditions in the liquid 104 that may be undesirable for certain components (e.g., pumps) receiving the liquid 104 from the liquid discharge line 106.

The system 100 additionally includes a diffuser 120 (e.g., diffusion horn) that is fixed to and positioned within the interior 103 of the pressurized tank 102. The diffuser 120 is in communication with the gas delivery line 108 to receive the gaseous substance 190 from the gas delivery line 108 and deliver the gaseous substance 190 into the interior 103 of the pressurized tank 102. Generally, the diffuser 120 helps to reduce the speed of the gaseous substance 190 received from the gas delivery line 108, and deliver the gaseous substance 190 into the pressurized tank 102 at a location and direction (as indicated by directional arrows 114), such that negative interactions with the liquid 104 in the pressurized tank 102 are reduced. For example, in some implementations, the diffuser 120 slows the speed of the gaseous substance 190 from sonic speeds, when received from the gas delivery line 108, to subsonic speeds, when expelled into the interior 103 of the pressurized tank 102. Additionally, for example, the diffuser 120 expels all of the gaseous substance 190 into the interior 103 of the pressurized tank 102 at a location near an uppermost surface 115 of the interior 103 of the pressurized tank 102. As another example, the diffuser 120 expels all of the gaseous substance 190 into the interior 103 of the pressurized tank 102 substantially parallel to the uppermost surface 115 of the interior 103 of the pressurized tank 102. Other diffusers, such as those with a dead-ended perforated tube surrounded by a dead-ended perforated can, fail to sufficiently reduce the speed of gaseous substances entering pressurized tanks, and thermal and mechanical mixing of the gaseous substances with liquids in the pressurized tanks.

Figure 2:
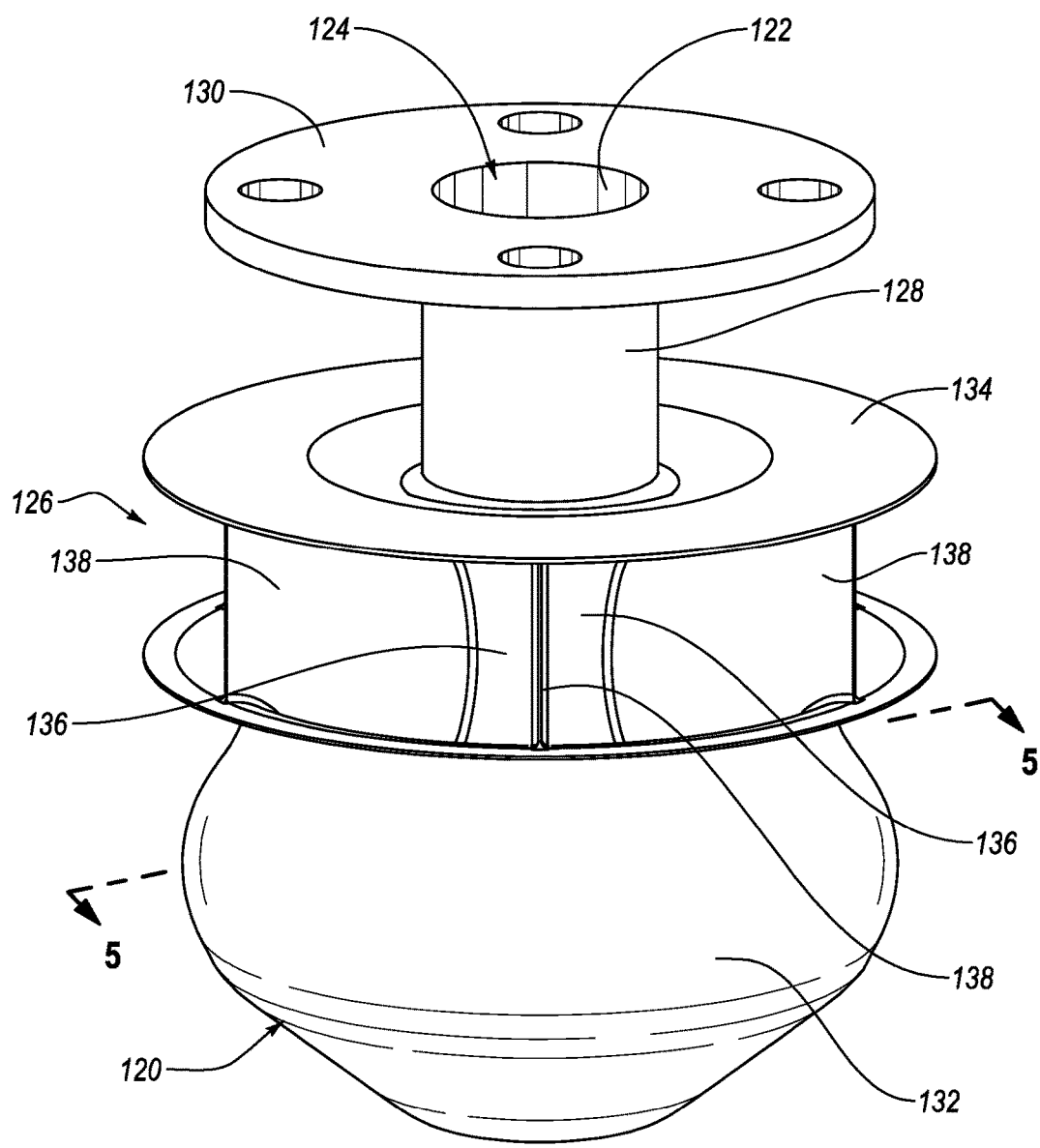
FIG. 2 is a perspective view of a diffuser for diffusing a gaseous substance, according to one or more embodiments of the present disclosure.
Figure 3:
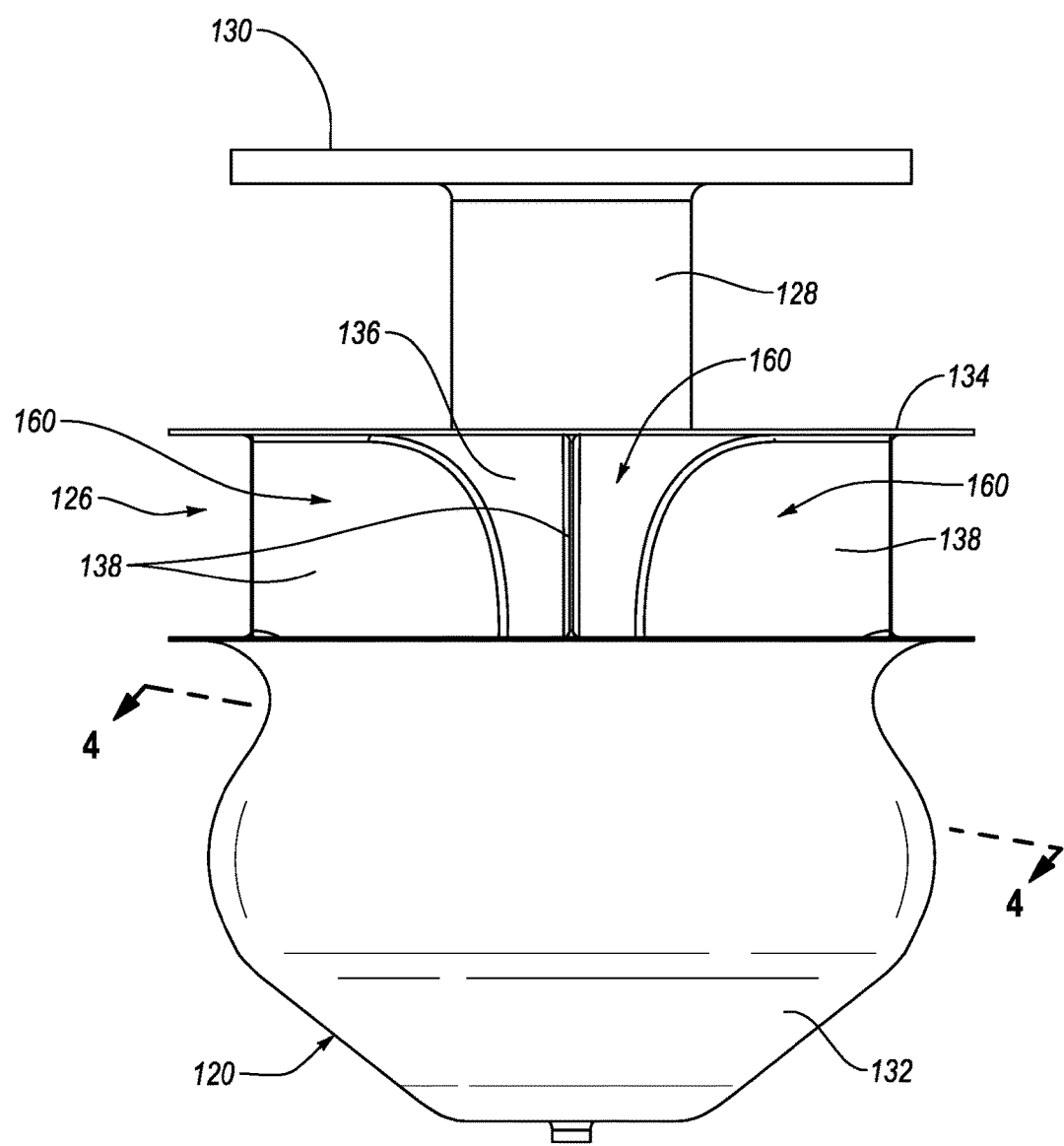
FIG. 3 is a side elevation view of the diffuser of FIG. 2, according to one or more embodiments of the present disclosure.

Referring to FIGS. 2 and 3, the diffuser 120 includes a channel 122 with an inlet 124, through which the gaseous substance 190 enters the diffuser 120, and an outlet 126, through which the gaseous substance 190 exits the diffuser 120. The channel 122 is defined by various objects of the diffuser 120. For example, the diffuser 120 includes an inlet tube 128 that defines the inlet 124 of the channel 122. Furthermore, the diffuser 120 includes a lower outer wall 132 and an upper outer wall 134 that define, therebetween, the outlet 126 of the channel 122. The inlet tube 128 includes a tank interface 130 that is configured to be secured to the uppermost surface 115 of the pressurized tank 102. In some implementations, the tank interface 130 includes a flange with one or more apertures formed in the flange. Respective fasteners can be inserted through each of the apertures formed in the flange and engaged with the pressurized tank 102 to secure the diffuser 120 to the uppermost surface 115 of the pressurized tank 102. The tank interface 130 is spaced apart from the upper outer wall 134 to define, therebetween, a space that promotes access to the tank interface 130 for tightening fasteners extending through the tank interface 130 and engaged with the pressurized tank 102.

The upper outer wall 134 is coupled with the inlet tube 128. In some embodiments, the upper outer wall 134 extends substantially transversely away from the inlet tube 128. The upper outer wall 134 can have a generally disk-like shape having a generally circular-shaped outer periphery. In some embodiments, the lower outer wall 134 has a generally bowl-like shape with a contoured outer surface having at least two points of inflection. In some implementations, an outer periphery of the portion of the lower outer wall 134 defining an open end of the lower outer wall 134 can have a generally circular-shaped outer periphery complementing the generally circular-shaped outer periphery of the upper outer wall 134. For example, the diameter of the outer periphery of the upper outer wall 134 can be the same as the diameter of the portion of the lower outer wall 134 defining the open end of the lower outer wall 134.

Figure 4:
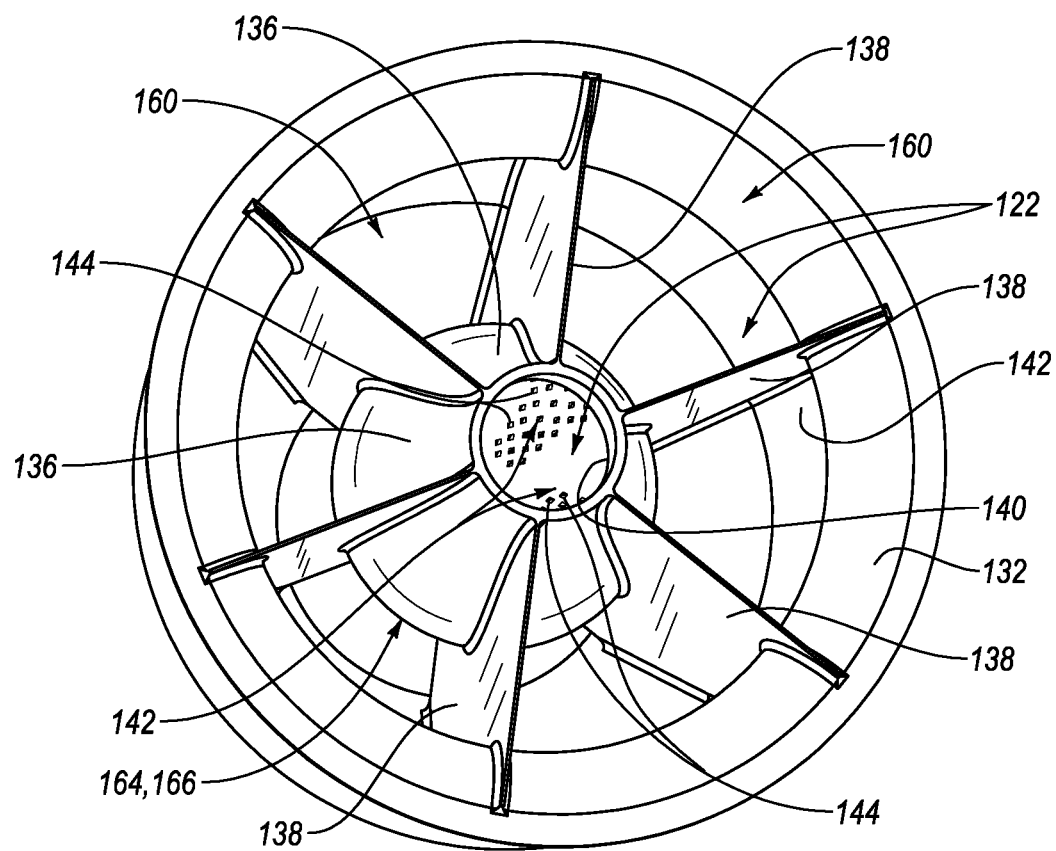
FIG. 4 is a cross-sectional top plan view of the diffuser of FIG. 3, taken along the line 4-4 of FIG. 3, according to one or more embodiments of the present disclosure.
Figure 5:
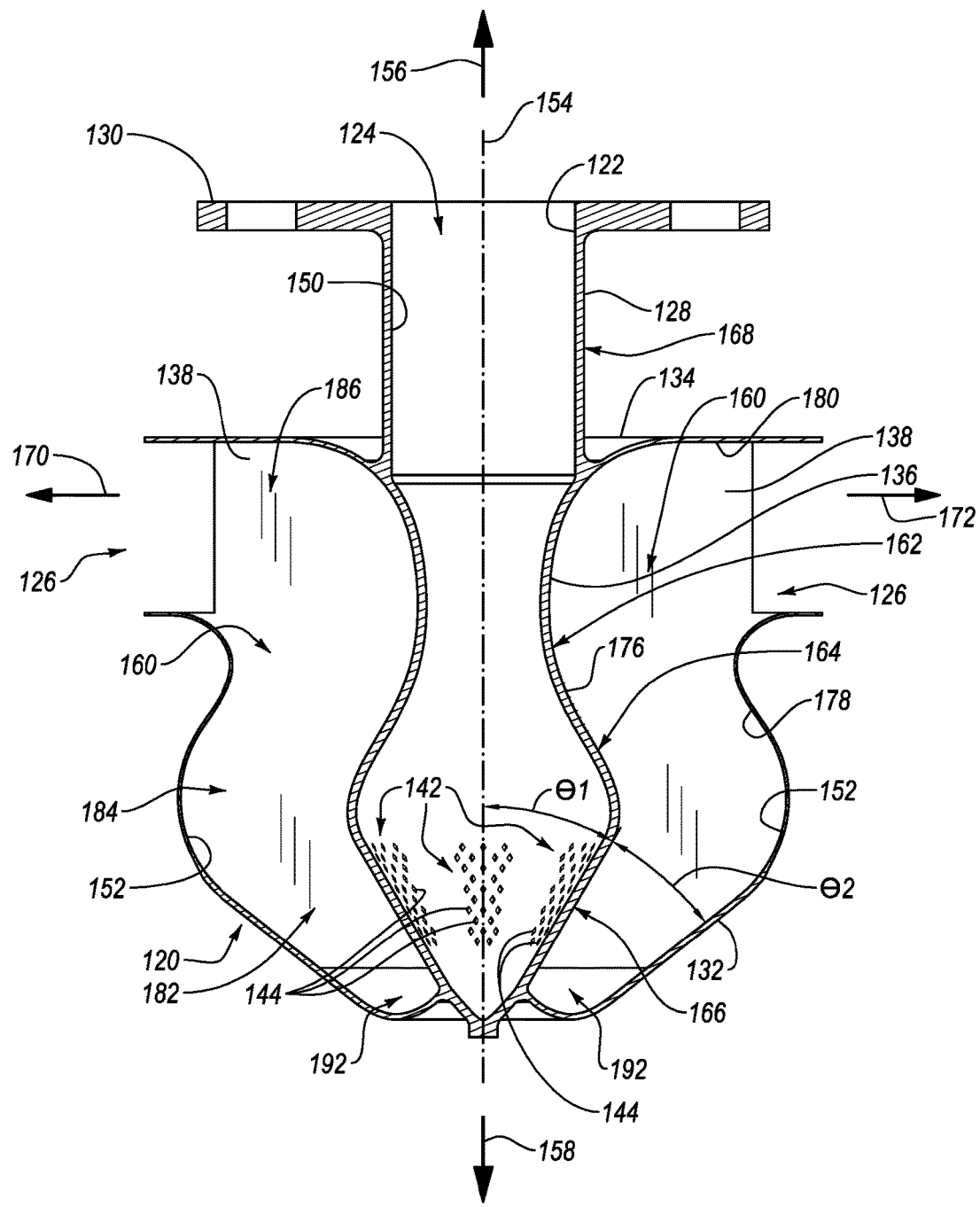
FIG. 5 is a cross-sectional side elevation view of the diffuser of FIG. 2, taken along the line 5-5 of FIG. 2, according to one or more embodiments of the present disclosure.

Referring now to FIGS. 4 and 5, the channel 122 of the diffuser 120 includes an inner portion 150 and an outer portion 152. The inlet 124 forms part of the inner portion 150 and the outlet 126 forms part of the outer portion 152. The inlet tube 128 includes an inner wall 136 that defines the inner portion 150 of the channel 122. More specifically, the inner portion 150 of the channel 122 is defined by an inner surface 174 of the inner wall 136 of the inlet tube 128. Accordingly, the size and shape of the inner portion 150 of the channel 122 corresponds with the size and shape of the inner surface 174 of the inner wall 136 of the inlet tube 128. In one embodiment, the inlet tube 128, and thus the inner portion 150 of the channel 122, is symmetrical about the central axis 154. In such an embodiment, and in other embodiments, the configuration of the inner portion 150 of the channel 122 can be defined according to a cross-sectional area, taken along a plane perpendicular to the central axis 154, of the inner portion 150 of the channel 122.

In a first direction 158 (e.g., downward direction), parallel to the central axis 154, the inner portion 150 of the channel 122 includes an inlet section 168, a neck section 162, a first conical section 164, and a second conical section 166. The neck section 162 is communicatively coupled with the inlet section 168 to receive gaseous substance 190 from (e.g., directly from) the inlet section 168. The first conical section 164 is communicatively coupled with the neck section 162 to receive gaseous substance 190 from (e.g., directly from) the neck section 162. The second conical section 166 is communicatively coupled with the first conical section 164 to receive gaseous substance 190 from (e.g., directly from) the first conical section 164. In certain implementations, the inner portion 150 of the channel 122 does not include the neck section 162 such that the first conical section 166 is communicatively coupled with the inlet section 168 to receive gaseous substance 190 from (e.g., directly from) the inlet section 168. The outlet 126 of the channel 122 is between the inlet 124 of the channel 122 and the second conical section 166 of the inner portion 154 of the channel 122.

The inlet section 168 of the inner portion 150 of the channel 122 has a cross-sectional area that is constant along the central axis 154 in the first direction 158. The neck section 162 has a cross-sectional area that first decreases, from the cross-sectional area of the inlet section 168, along the central axis 154 in the first direction 158, and then increases along the central axis 154 in the first direction 158. Accordingly, in a flow direction, the neck section 162 of the inner portion 150 of the channel 122 decreases to a narrow passage, with a cross-sectional area less than the cross-sectional area of the inlet section 168, and increases from the narrow passage. However, the cross-sectional area of the narrow passage of the neck section 162 is large enough to avoid choking the gaseous substance 190 flowing therethrough.

The first conical section 164 of the inner portion 150 of the channel 122 has a cross-sectional area that increases, from the neck section 162, along the central axis 154 in the first direction 158. The cross-sectional area of the first conical section 164 increases to a cross-sectional area greater than the cross-sectional area of the inlet section 168. According to certain implementations, the cross-sectional area of the first conical section 164 increases to at least 1.2 times that of the inlet section 168 in some examples and increases to at least 1.5 times that of the inlet section 168 in other examples. In some implementations, the rate of increase of the cross-sectional area of the first conical section 164 is constant along the central axis 154 in the first direction 158. Accordingly, the first conical section 164 can have the shape of a cone. In other implementations, the rate of increase of the cross-sectional area of the first conical section 164 varies along the central axis 154 in the first direction 158. Accordingly, the first conical section 164 can have a shape different than a cone, such as a dome or sphere. In certain implementations, the rate of increase of the cross-sectional area of the first conical section 164, at the transition from the neck section 162 to the first conical section 164, is equal to the rate of increase of the cross-sectional area of the neck section 162 such that the transition from the neck section 162 to the first conical section 164 is seamless.

The second conical section 166 of the inner portion 150 of the channel 122 has a cross-sectional area that decreases, from the first conical section 164, along the central axis 154 in the first direction 158. The cross-sectional area of the second conical section 166 decreases to a cross-sectional area less than the cross-sectional area of the inlet section 168. For example, the second conical section 166 is close ended such that the cross-sectional area of the second conical section 166 decreases to zero. In some implementations, the rate of increase of the cross-sectional area of the second conical section 166 is constant along the central axis 154 in the first direction 158. Accordingly, the second conical section 166 can have the shape of a cone (e.g., an inverted cone). The inner wall 136 of the inlet tube 128 defining the second conical section 166 is angled relative to the central axis 154 to define an angle θ1 with the central axis 154.

In other implementations, the rate of increase of the cross-sectional area of the second conical section 166 varies along the central axis 154 in the first direction 158. Accordingly, the second conical section 166 can have a shape different than a cone, such as a dome or sphere. In certain implementations, the transition from the first conical section 164 to the second conical section 166 is smooth or rounded.

The outer portion 152 of the channel 122 is defined by the inner wall 136 of the inlet tube 128, lower outer wall 132, and upper outer wall 134. More specifically, the outer portion 152 of the channel 122 is defined between an outer surface 176 of the inner wall 136 of the inlet tube 128, an inner surface 178 of the lower outer wall 132, and an inner surface 180 of the upper outer wall 134. The lower outer wall 132 extends upward, in the second direction 156, about the inner wall 136 inlet tube 128 in a spaced apart manner. Therefore, the outer portion 152 of the channel 122 is defined around the inlet tube 128, and thus the inner portion 150 of the channel 122. In other words, the outer portion 152 wraps around the inner portion 150 such that the outer portion 152 has a generally annular shape. As defined herein, an annular shape can be a ring shape or a toroid shape.

The size and shape of the outer portion 152 of the channel 122 corresponds with the size and shape of the outer surface 176 of the inner wall 136 of the inlet tube 128, the inner surface 178 of the lower outer wall 132, and the inner surface 180 of the upper outer wall 134. In one embodiment, the inner wall 136, lower outer wall 132, and upper outer wall 134, and thus the outer portion 152 of the channel 122, is symmetrical about the central axis 154. In such an embodiment, and in other embodiments, the configuration of the outer portion 152 of the channel 122 can be defined according to a cross-sectional area, taken along a plane perpendicular to the central axis 154, of the outer portion 152 of the channel 122.

In a second direction 156 (e.g., upward direction), opposite the first direction 158, and thus parallel to the central axis 154, the outer portion 152 of the channel 122 includes a first annular section 182, second annular section 184, and third annular section 186. The second annular section 184 is communicatively coupled with the first annular section 182 to receive gaseous substance 190 from (e.g., directly from) the first annular section 182. The third annular section 186 is communicatively coupled with the second annular section 184 to receive gaseous substance 190 from (e.g., directly from) the second annular section 184. Moreover, the outer surface 176 of the portion of the inner wall 136 of the inlet tube 128 that defines the second conical section 166 at least partially defines the first annular section 182. Similarly, the outer surface 176 of the portion of the inner wall 136 of the inlet tube 128 that defines the first conical section 164 at least partially defines the second annular section 184 and the outer surface 176 of the inner wall 136 of the inlet tube 128 that defines a lower portion of the neck section 162 at least partially defines the second annular section 184. Additionally, the outer surface 176 of the inner wall 136 of the inlet tube 128 that defines an upper portion of the neck section 162 at least partially defines the third annular section 186.

The first annular section 182 of the outer portion 152 of the channel 122 has a cross-sectional area that increases along the central axis 154 in the second direction 156. More specifically, the inner surface 178 of the lower outer wall 132 defining the first annular section 182 is angled relative to the central axis 154 to define an angle θ2 with the central axis 154 that is greater than the angle θ1 between the inner wall 136 of the inlet tube 128 defining the second conical section 166 and the central axis 154. Accordingly, in the second direction 156, the inner surface 178 of the lower outer wall 132 defining the first conical section 182 and the inner wall 136 of the inlet tube 128 defining the first conical section 164 diverge. In some implementations, the rate of increase of the cross-sectional area of the first annular section 182 is constant along the central axis 154 in the second direction 156. In other implementations, the rate of increase of the cross-sectional area of the first annular section 182 varies along the central axis 154 in the second direction 156. In the second direction 156, the first annular section 182 is angled outwardly away from the central axis 154. In other words, the inner wall 136 of the inlet tube 128 and the lower outer wall 132 that define the first annular section 182 are angled outwardly away from the central axis 154 in the second direction 156.

The second annular section 184 of the outer portion 152 of the channel 122 has a cross-sectional area that increases or is constant along the central axis 154 in the second direction 156. In some implementations, in the second direction 156, the inner surface 178 of the lower outer wall 132 and the inner wall 136 of the inlet tube 128 defining the second annular section 184 diverge such that the cross-sectional area of the second annular section 184 increases in the second direction 156. According to one implementation, a rate of increase of the cross-sectional area of the second annular section 184 is constant along the central axis 154 in the second direction 156. In other implementations, the rate of increase of the cross-sectional area of the second annular section 184 varies along the central axis 154 in the second direction 156. In the second direction 156, the second annular section 184 is angled inwardly toward the central axis 154. In other words, the inner wall 136 of the inlet tube 128 and the lower outer wall 132 that define the second annular section 184 are angled inwardly toward the central axis 154 in the second direction 156.

The third annular section 186 of the outer portion 152 of the channel 122 has a cross-sectional area that increases or is constant along the central axis 154 in the second direction 156. In some implementations, the inner surface 178 of the lower outer wall 132 and the inner wall 136 of the inlet tube 128 defining the third annular section 186 diverge, in the second direction 156, such that the cross-sectional area of the third annular section 186 increases in the second direction 156. According to one implementation, a rate of increase of the cross-sectional area of the third annular section 186 is constant along the central axis 154 in the second direction 156. In other implementations, the rate of increase of the cross-sectional area of the third annular section 186 varies along the central axis 154 in the second direction 156. In the second direction 156, the third annular section 186 is angled outwardly away from the central axis 154. In other words, the inner wall 136 of the inlet tube 128 and the lower outer wall 132 that define the third annular section 186 are angled outwardly away from the central axis 154 in the second direction 156. In some implementations, at the outlet 126 of the channel 122, the third annular section 186 extends outwardly away from the central axis 154. In other words, a portion of the inner wall 136 of the inlet tube 128 and the lower outer wall 132 that define the third annular section 186 are angled outwardly away from the central axis 154 in the second direction 156.

Because the first annular section 182 is angled outwardly away from the central axis 154, the second annular section 184 is angled inwardly toward the central axis 154, and the third annular section 186 is angled outwardly away from the central axis 154, a cross-section of the outer portion 152, taken along a plane parallel to and extending through the central axis 154, is generally S-shaped, has multiple points of inflection, or has multiple switchbacks. The transitions between the first annular section 182, second annular section 184, and third annular section 186 can be smooth or rounded to facilitate the flow of gaseous substance 190 through the outer portion 152 of the channel 122.

According to some embodiments, the cross-sectional shapes, taken along planes perpendicular to the central axis 154, of the inner portion 150 and the outer portion 152 of the channel 122 are circular. However, in other embodiments, the cross-sectional shapes, taken along planes perpendicular to the central axis 154, of the inner portion 150 and the outer portion 152 of the channel 122, can have shapes other than circular, such as square, triangular, ovular, and the like.

To facilitate flow of gaseous substance 190 through the outer portion 152 of the channel 122, one or more separators 138 are positioned in the outer portion 152 to separate the outer portion 152 into at least two sub-channels 160. The separators 138, which can be considered stiffeners or straighteners in some implementations, can be substantially flat and extend vertically (e.g., parallel with the central axis 154) within the outer portion 152 such that corresponding sub-channels 160 of the outer portion 152 also extend vertically. In some implementations, the separators 138 also extend radially, relative to the central axis 154, entirely from the outer surface 176 of the inner wall 136 of the inlet tube 128 to the inner surface 178 of the lower outer wall 132 and the inner wall 136 of the inlet tube 128. Also, the separators 138 can extend entirely between the inner surface 178 of the lower outer wall 132 to the inner surface 178 of the upper outer wall 132. Accordingly, the separators 138 can extend up to proximate the outlet 126 of the outer portion 152 of the channel 122. The separators 138 may extend down to proximate a lower end of the outer portion 152 of the channel 122 (e.g., adjacent a closed end of the second conical section 166 of the inner portion 150 of the channel 122). For example, the separators 138 may terminate short of the lower end of the outer portion of the channel 122 such that a lower part of the outer portion 152 is not separated by the separators 138, but forms a non-partitioned annular pocket 192.

The diffuser 120 can have any of various quantities of separators 138 and sub-channels 160. In one implementation, the diffuser 120 includes multiple separators (e.g., six) and multiple sub-channels 160 (e.g., six). The separators 138 are arranged within the outer portion 152 of the channel 122 such that the sub-channels 160 have the same size and are uniformly distributed about the central axis 154.

Figure 6:
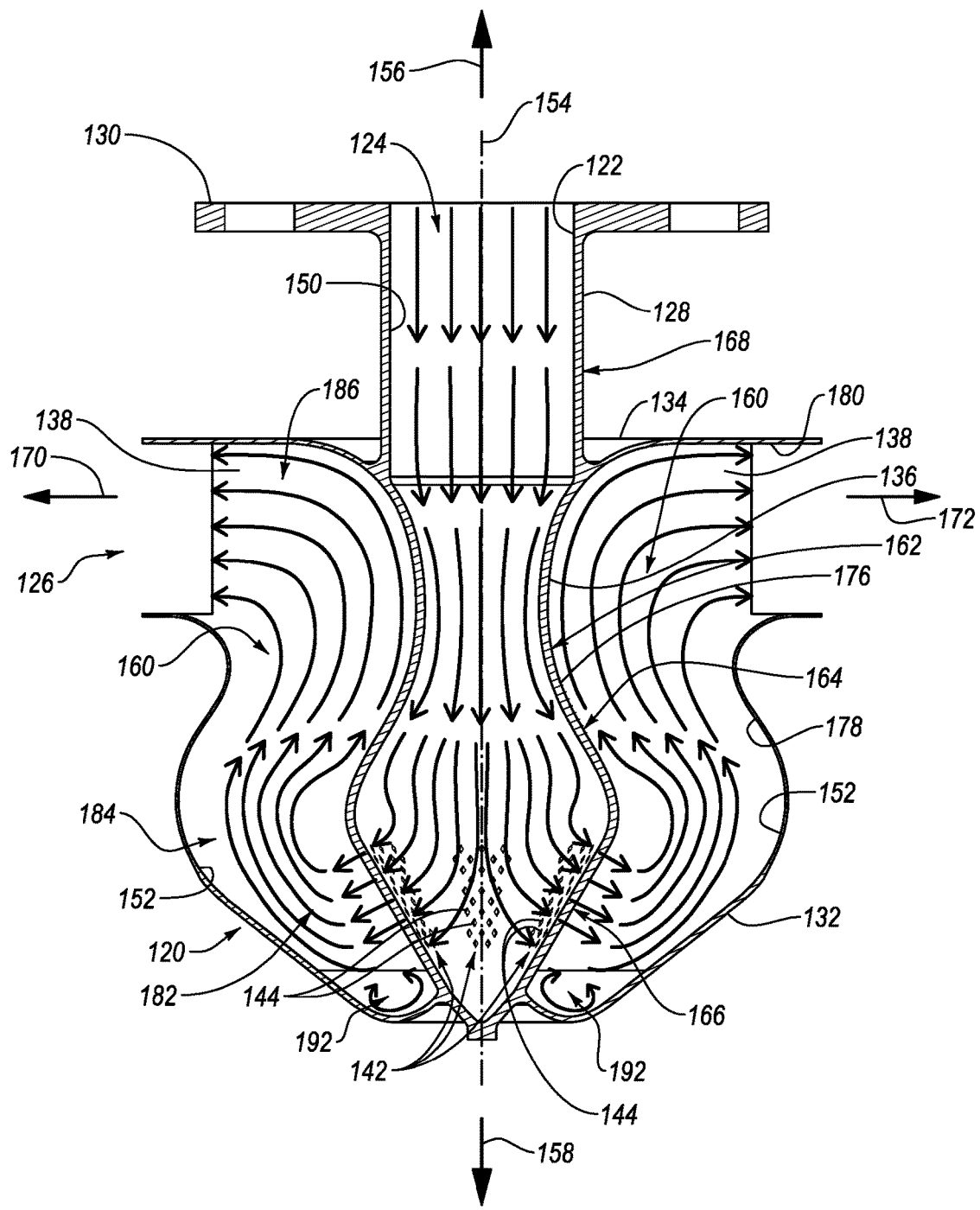
FIG. 6 is a cross-sectional side elevation view of the diffuser of FIG. 2, taken along the line 5-5 of FIG. 2 and shown flow paths of the gaseous substance through the diffuser, according to one or more embodiments of the present disclosure.

As shown in FIGS. 4-6, the diffuser 120 additionally includes a plurality of orifices 144 that communicatively couple the second conical section 166 of the inner portion 150 of the channel 122 with the first annular section 182 of the outer portion 152 of the channel 122. The plurality of orifices 144 are formed in and extend entirely through the inner wall 136 of the inlet tube 128 defining the second conical section 166. In some implementations, each orifice 144 of the plurality of orifices 144 has the same size and shape. According to other implementations, at least one orifice 144 of the plurality of orifices 144 has a size and/or shape that is different than another of the orifices 144 of the plurality of orifices 144. The orifices 144 can have any of various shapes. For example, in one implementation, the orifices 144 each have a diamond shape. In other implementations, the orifices 144 have other shapes, such as circular, triangular, ovular, rectangular, hexagonal, amorphous, etc. The orifices 144 can be arranged in at least one pattern 142, which can be either symmetrical or non-symmetrical. Arranging orifices 144 in a pattern 142 that is symmetrical can help to facilitate a uniform flow of gaseous substance 190 from the orifices 144. According to some implementations, the plurality of orifices 144 are arranged into multiple patterns 142, which are symmetrical, each communicatively coupling a respective one of multiple sub-channels 160 with the second conical section 166.

Generally, the quantity and size of the orifices 144 corresponds with a desired ratio of the cross-sectional area of the inlet 124 of the channel 122 to the combined cross-sectional area of the orifices 144. In some implementations, the ratio of the cross-sectional area of the inlet 124 of the channel 122 to the combined cross-sectional area of the orifices 144 is greater than one. According to certain implementations, ratio of the cross-sectional area of the inlet 124 of the channel 122 to the combined cross-sectional area of the orifices 144 is greater than two in order to purposely choke the flow across the orifices 144. In some implementations, however, it may be desirable to operate the orifices 144 in an un-choked condition, which is dependent on the ratio of the inlet pressure at channel 122 to the pressure of the gaseous substance 190. In some embodiments, the cross-sectional area of each orifice 144 is a minimum cross-sectional area, given manufacturing and flow-through constraints, and the quantity of the orifices 144 is selected to achieve a desired ratio of the cross-sectional area of the inlet 124 of the channel 122 to the combined cross-sectional area of the orifices 144.

In some embodiments, the entirety of the diffuser 120 is made using additive manufacturing techniques to have a one-piece monolithic construction. In other words, in certain implementations, no portion of the diffuser 120 is separately made and attached to another portion of the diffuser 120. Rather, the diffuser 120 is made in the same manufacturing step without the need to assemble or attach together separate components. Accordingly, the diffuser 120 can have a complex design and be made with less material, labor, energy, and tooling storage, shorter lead times, and lower overhead. The diffuser 120 can be made with any of various homogenous materials, such as plastics, metals (e.g., nickel chromium), fiber-reinforced composites, and the like.

Referring to FIG. 6, flow paths, indicated by directional arrows or vectors, of the gaseous substance 190 show how the gaseous substances 190 flows through the various sections of the inner portion 150 and outer portion 152 of the channel 122. Initially, the gaseous substance 190 flows or passes from a gas delivery line 108 into and through the inlet 124 of the inner portion 150 of the channel 122 in the first direction 158 along the central axis 154. The velocity of the gaseous substance 190 flowing through the inlet 124 can reach sonic or supersonic speeds. Furthermore, because the cross-sectional area of the inlet 124 is substantially constant, the velocity of the gaseous substance 190 remains relatively unchanged as it flows through the inlet 124. In embodiments having an inner portion 150 of the channel 122 with a neck section 162, the speed of the gaseous substance may be accelerated as it passes through the neck section 162 in substantially the first direction 158.

From the inlet 124 or neck section 162, the gaseous substance 190 flows into the first conical section 164 of the inner portion 150 of the channel 122. Due to the increasing cross-sectional area of the first conical section 164 in the first direction 158, as the gaseous substance 190 flows through the first conical section 164 it expands, which causes a drop in the velocity of the gaseous substance 190. Furthermore, expansion of the gaseous substance 190 in the first conical section 164 induces some of the gaseous substance 190 in the first conical section 164 to flow slightly radially outwardly away from the central axis 154 to fill the first conical section 164.

Then, from the first conical section 164, the gaseous substance 190 flows into the second conical section 166 of the inner portion 160 of the channel 122. Because of the decreasing cross-sectional area of the second conical section 166 in the first direction 158, as the gaseous substance 190 flow through the second conical section 164 in the first direction 158, the gaseous substance 190 is compressed and the pressure of the gaseous substance 190 increases and the velocity of the gaseous substance 190 decreases. From the second conical section 166, the gaseous substance 190 passes into the first annular section 182 of the outer portion 152 of the channel 122 through the plurality of orifices 144. The plurality of orifices 144, with a reduced cross-sectional area, act to accelerate and reduce the pressure of the gaseous substance 190. The gaseous substance 190 exits the plurality of orifices 144, and enters the first annular section 182, as a plurality of discrete jets of gaseous substance 190 each exiting a respective one of the plurality of orifices 144. Due to the compression of the gaseous substance 190 in the second conical section 166, and the ratio of the cross-sectional area of the inlet 124 to the combined cross-sectional area of the plurality of orifices 144, the flow through the plurality of orifices 144 is sonically choked. Because the flow through the plurality of orifices 144 is sonically choked, the flow from each of the plurality of orifices 144 is uniform and increased to a sonic velocity. In other words, sonically choking the gaseous substance 190 in the second conical section 166 produces a plurality of uniform jets, as the same sonic velocity, from the plurality of orifices 144 into the first annular section 182. Additionally, with the plurality of orifices 144 formed in the portion of the inner wall 136 of the inlet tube 128 at the angle θ1, the jets enter the first annular section 182 at a corresponding angle with the central axis 154.

The first annular section 182 redirects the gaseous substance 190 from flowing at a downwardly directed angle away from and relative to the central axis 154 to an upwardly directed angle away from and relative to the central axis 154. Moreover, due to the increasing cross-sectional area of the first annular section 182 in the second direction 156, as the gaseous substance 190 flows through the first annular section 182 it expands, which causes a drop in the velocity of the gaseous substance 190. Additionally, the redirection of the jets of gaseous substance 190 promotes viscous shear to break up the jets of gaseous substance 190 and encourage uniform flow across the outer portion 152.

From the first annular section 182, the gaseous substance 190 flows into the second annular section 184, which redirects the gaseous substance 190 from flowing upwardly and outwardly from the central axis 154 to upwardly and inwardly toward the central axis 154. Again, the redirection of the flow of gaseous substance 190 promotes further viscous shear to further break up the jets of gaseous substance 190 and increase the uniformity of the flow across the outer portion 152. Also, the increasing cross-sectional area of the second annular section 184 in the second direction 156 causes further expansion of and an additional drop in the velocity of the gaseous substance 190 as the gaseous substance 190 flows through the second annular section 184.

Then, from the second annular section 184, the gaseous substance 190 flows into the third annular section 186, which redirects the gaseous substance 190 from flowing upwardly and inwardly toward the central axis 154 to flowing upwardly and outwardly from the central axis 154. As mentioned above, the additional redirection of the flow of gaseous substance 190 promotes further viscous shear to further break up the jets of gaseous substance 190 and increase the uniformity of the flow across the outer portion 152. Also, the increasing cross-sectional area of the third annular section 186 in the second direction 156 results in further expansion of and an additional drop in the velocity of the gaseous substance 190 as the gaseous substance 190 flows through the third annular section 186.

From the third annular section 184, the gaseous substance 190 flows through and out of the outlet 126 of the outer portion 152 of the channel 122, thus flowing out of the diffuser 120 and into the pressurized tank 102, for example. In some implementations, the third annular section 184 sufficiently redirects the flow of the gaseous substance 190 such that the flow is parallel with third and fourth directions 170, 172, respectively, perpendicular to the central axis 154, as the flow exits the outlet 126 of the outer portion 152 of the channel 122. Additionally, because the outer portion 152 redirects the flow upwardly after the flow exits the inner portion 150, the gaseous substance 190 exits the outlet 126 at a location vertically higher than second conical section 166. Also, after flowing out of the plurality of orifices 144 (which are the only set of reduced-area orifices that the gaseous substance 190 flows through), there are no other downstream flow restrictors (e.g., additional reduced-area orifices) before the gaseous substance 190 exits the outlet 126.

Figure 7:
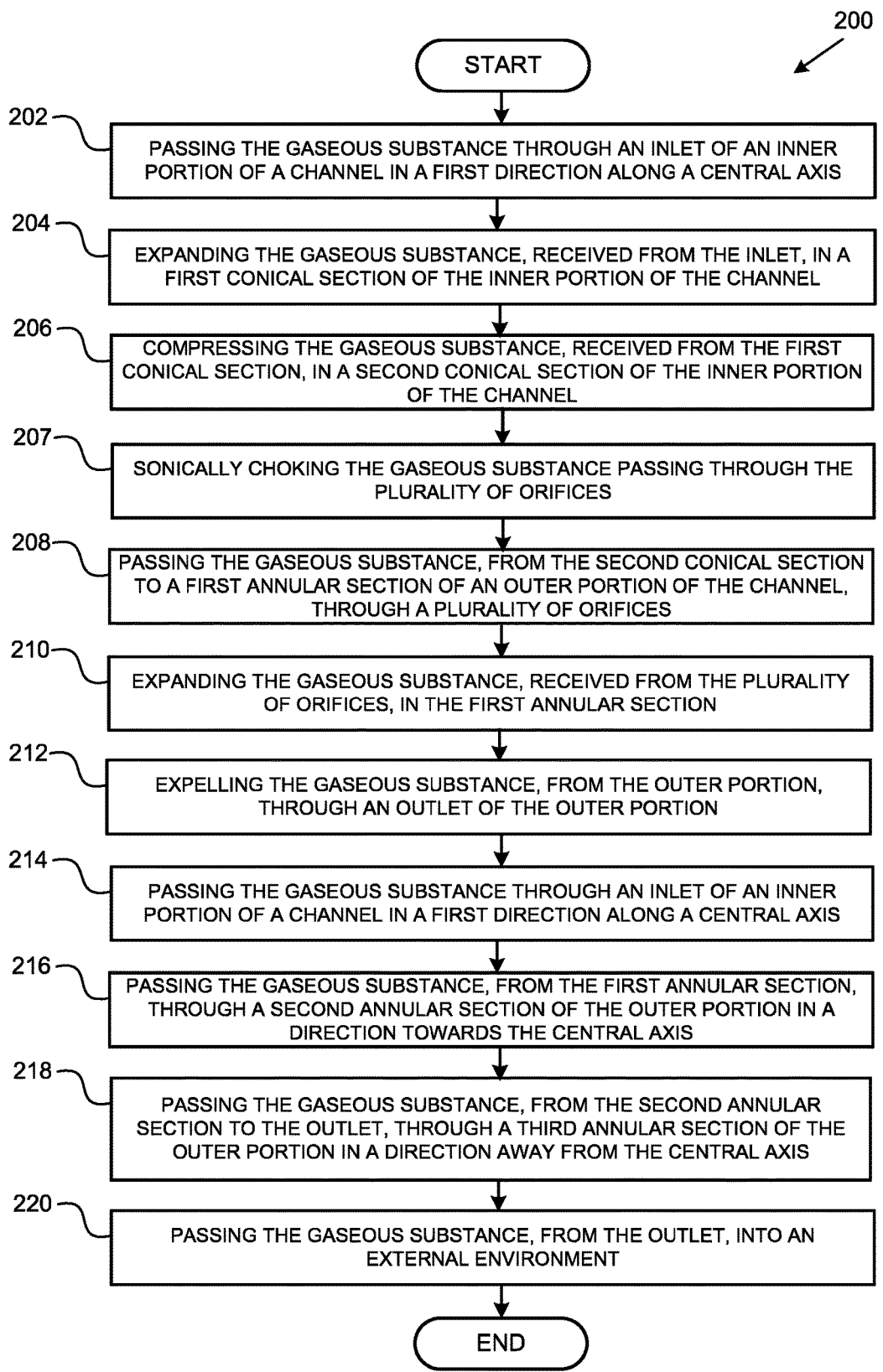
FIG. 7 is schematic flow diagram of a method of diffusing a gaseous substance, according to one or more embodiments of the present disclosure.

Referring to FIG. 7, according to one embodiment, a method 200 of diffusing a gaseous substance includes passing the gaseous substance through an inlet of an inner portion of a channel in a first direction along a central axis at step 202. The method 200 also includes expanding the gaseous substance, received from the inlet, in a first conical section of the inner portion of the channel at step 204. Additionally, the method 200 includes compressing the gaseous substance, received from the first conical section, in a second conical section of the inner portion of the channel at step 206. At step 207, the method may also include sonically choking the gaseous substance passing through the plurality of orifices. The method 200 also includes passing the gaseous substance, from the second conical section to a first annular section of an outer portion of the channel, through a plurality of orifices at 208. Furthermore, the method 200 includes expanding the gaseous substance, received from the plurality of orifices, in the first annular section at 210 and expelling the gaseous substance, from the outer portion, through an outlet of the outer portion at 212.

In some implementations, the method 200 also includes passing the gaseous substance through an inlet of an inner portion of a channel in a first direction along a central axis at step 214, passing the gaseous substance, from the first annular section, through a second annular section of the outer portion in a direction towards the central axis at step 216, and passing the gaseous substance, from the second annular section to the outlet, through a third annular section of the outer portion in a direction away from the central axis at 218. Additionally, the method 200 includes passing the gaseous substance, from the outlet, into an external environment at step 220. The external environment can be, for example, a pressurized tank, cavity, vessel, and the like.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A diffuser for diffusing a gaseous substance, the diffuser comprising:
   a channel that comprises an inner portion, having an inlet through which the gaseous substance enters the diffuser, and an outer portion, having an outlet through which the gaseous substance exits the diffuser, wherein:
      the inner portion comprises a first conical section, having an increasing cross-sectional area, taken along a plane perpendicular to a central axis, in a first direction;
      the inner portion further comprises a second conical section, having a decreasing cross-sectional area, taken along a plane perpendicular to the central axis, in the first direction, the second conical section being communicatively coupled with the first conical section; and
      the outer portion comprises a first annular section having an increasing cross-sectional area, taken along a plane perpendicular to the central axis, in a second direction opposite the first direction; and
   a plurality of orifices, communicatively coupling the second conical section with the first annular section.

2. The diffuser according to claim 1, wherein:
   the outer portion further comprises a second annular section, communicatively coupled with the first annular section;
   the outer portion further comprises a third annular section, communicatively coupled with the second annular section;
   wherein, in the second direction, the first annular section is angled outwardly away from the central axis, the second annular section is angled inwardly toward the central axis, and the third annular section is angled outwardly away from the central axis.

3. The diffuser according to claim 2, wherein a cross-section of the outer portion, taken along a plane parallel to and extending through the central axis, is S-shaped.

4. The diffuser according to claim 1, wherein the inner portion and the outer portion are concentric with the central axis.

5. The diffuser according to claim 1, wherein each orifice of the plurality of orifices is diamond-shaped.

6. The diffuser according to claim 1, wherein the plurality of orifices are arranged in at least one pattern that is symmetrical.

7. The diffuser according to claim 1, further comprising at least one separator in the outer portion, the separator separating the outer portion into at least two sub-channels.

8. The diffuser according to claim 7, wherein:
the plurality of orifices are arranged in at least two symmetrical patterns; and
the orifices of the plurality of orifices of each of the at least two symmetrical patterns communicatively couple the second conical section with a respective one of the at least two sub-channels.

9. The diffuser according to claim 7, wherein the at least one separator extends along a partial length of the first annular section of the outer portion.

10. The diffuser according to claim 1, wherein:
the inlet is parallel to the central axis; and
the outlet is perpendicular to the central axis.

11. The diffuser according to claim 1, wherein the outer portion wraps around the inner portion.

12. The diffuser according to claim 1, wherein:
the inner portion further comprises a neck section between the inlet and the first conical section;
the neck section has a cross-sectional area, taken along a plane perpendicular to the central axis, that is smaller than any cross-sectional area, taken along a plane perpendicular to the central axis, of the inlet and any cross-sectional area, taken along a plane perpendicular to the central axis, of the first conical section.

13. The diffuser according to claim 1, wherein a ratio of a cross-sectional area of the inlet to a combined cross-sectional area of the plurality of orifices is at least two.

14. The diffuser according to claim 1, wherein:
a cross-sectional area of the first conical section is greater than a cross-sectional area of the inlet; and
a cross-sectional area of the second conical section is greater than a cross-sectional area of the inlet.

15. The diffuser according to claim 1, wherein the diffuser has a one-piece monolithic construction.

16. The diffuser according to claim 1, wherein the outlet is between the inlet and the second conical section.

17. A system, comprising:
a pressurized tank, configured to contain a liquid within an interior of the pressurized tank;
a liquid discharge line in communication with the pressurized tank to discharge liquid from the pressurized tank;
a gas delivery line in communication with the pressurized tank to deliver a gaseous substance to the pressurized tank; and
a diffuser, fixed to and positioned within the interior of the pressurized tank, in communication with the gas delivery line to receive the gaseous substance from the gas delivery line and deliver the gaseous substance into the interior of the pressurized tank, wherein the diffuser comprises:
a channel that comprises an inner portion, having an inlet through which the gaseous substance enters the diffuser, and an outer portion, having an outlet through which the gaseous substance exits the diffuser, wherein:
the inner portion comprises a first conical section having an increasing cross-sectional area, taken along a plane perpendicular to a central axis in a first direction;
the inner portion further comprises a second conical section, having a decreasing cross-sectional area, taken along a plane perpendicular to the central axis, in the first direction, the second conical section being communicatively coupled with the first conical section;
the outer portion wraps around the inner portion;
a cross-section of the outer portion, taken along a plane perpendicular to the central axis, is annular-shaped; and
a cross-section of the outer portion, taken along a plane parallel to and extending through the central axis, is S-shaped; and
a plurality of orifices, communicatively coupling the second conical section with the outer portion.

18. A method of diffusing a gaseous substance, the method comprising:
passing the gaseous substance through an inlet of an inner portion of a channel in a first direction along a central axis;
expanding the gaseous substance, received from the inlet, in a first conical section of the inner portion of the channel;
compressing the gaseous substance, received from the first conical section, in a second conical section of the inner portion of the channel;
passing the gaseous substance, from the second conical section, to a first annular section of an outer portion of the channel through a plurality of orifices;
expanding the gaseous substance, received from the plurality of orifices, in the first annular section; and
expelling the gaseous substance, from the outer portion, through an outlet of the outer portion.

19. The method according to claim 18, further comprising:
passing the gaseous substance through the first annular section in a direction away from the central axis;
passing the gaseous substance, from the first annular section, through a second annular section of the outer portion in a direction towards the central axis; and
passing the gaseous substance, from the second annular section to the outlet, through a third annular section of the outer portion in a direction away from the central axis.

20. The method according to claim 18, further comprising sonically choking the gaseous substance passing through the plurality of orifices.

* * * * *